(12) United States Patent  
Ringseth et al.

(10) Patent No.: US 8,839,214 B2  
(45) Date of Patent: Sep. 16, 2014

(54) INDEXABLE TYPE TRANSFORMATIONS

(75) Inventors: Paul F. Ringseth, Bellevue, WA (US); Weirong Zhu, Kirkland, WA (US); Rick Molloy, Redmond, WA (US); Charles D. Callahan, II, Seattle, WA (US); Yosseff Levanoni, Redmond, WA (US); Lingli Zhang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 751 days.

(21) Appl. No.: 12/827,217

(22) Filed: Jun. 30, 2010

(65) Prior Publication Data

US 2012/0005662 A1  Jan. 5, 2012

(51) Int. Cl.  
*G06F 9/45* (2006.01)

(52) U.S. Cl.  
USPC .......................................................... 717/149

(58) Field of Classification Search  
USPC .......................................... 717/148, 149, 151  
See application file for complete search history.

(56) References Cited

U.S. PATENT DOCUMENTS

| | | | |
|---|---|---|---|
| 6,895,115 B2 | 5/2005 | Tilton | |
| 7,263,695 B1 | 8/2007 | Muzaffar et al. | |
| 2004/0064806 A1* | 4/2004 | Johnston-Watt et al. | 717/124 |
| 2005/0091025 A1* | 4/2005 | Wilson et al. | 703/16 |
| 2005/0160321 A1* | 7/2005 | Cleaveland et al. | 714/38 |
| 2005/0210023 A1* | 9/2005 | Barrera et al. | 707/5 |
| 2005/0246698 A1* | 11/2005 | Chung | 717/151 |
| 2006/0101104 A1 | 5/2006 | Bhanot et al. | |
| 2007/0150126 A1* | 6/2007 | Crank | 701/4 |
| 2008/0082968 A1* | 4/2008 | Chang et al. | 717/128 |
| 2008/0109194 A1* | 5/2008 | Gaudette | 703/6 |
| 2008/0222583 A1* | 9/2008 | Devins et al. | 716/5 |
| 2009/0177876 A1* | 7/2009 | Wang et al. | 713/1 |
| 2009/0307671 A1* | 12/2009 | White et al. | 717/149 |
| 2010/0094924 A1* | 4/2010 | Howard et al. | 709/201 |
| 2011/0131393 A1* | 6/2011 | Ramchandran et al. | 712/37 |

OTHER PUBLICATIONS

George, et al., "Parallel Algorithms for Split-Aperture Conventional Beamforming", Retrieved at << http://www.hcs.ufl.edu/pubs/JCA1999.pdf >>, Journal of Computational Acoustics, vol. 7, No. 4, 1999, pp. 16.

Prechelt, et al., "Efficient Parallel Execution of Irregular Recursive Programs", Retrieved at << http://ieeexplore.ieee.org/stamp/stamp.jsp?tp=&arnumber=983944 >>, IEEE Transactions on Parallel and Distributed Systems, vol. 13, No. 2, Feb. 2002, pp. 2.

(Continued)

*Primary Examiner* — Anna Deng  
(74) *Attorney, Agent, or Firm* — Kevin Sullivan; Kate Drakos; Micky Minhas

(57) ABSTRACT

A high level programming language provides an extensible set of transformations for use on indexable types in a data parallel processing environment. A compiler for the language implements each transformation as a map from indexable types to allow each transformation to be applied to other transformations. At compile time, the compiler identifies sequences of the transformations on each indexable type in data parallel source code and generates data parallel executable code to implement the sequences as a combined operation at runtime using the transformation maps. The compiler also incorporates optimizations that are based on the sequences of transformations into the data parallel executable code.

18 Claims, 7 Drawing Sheets

(56) References Cited

OTHER PUBLICATIONS

Diaconu, et al., "Monte Carlo Methods in Sequential and Parallel Computing of 2D and 3D Ising Model", Retrieved at << http://www.inoe.ro/JOAM/pdf5_4/Diaconu.pdf >>, Journal of Optoelectronics and Advanced Materials, vol. 5, No. 4, Dec. 2003, pp. 971-976.

Zhang, et al., "Accurate Recasting of Parameter Estimation Algorithms using Sufficient Statistics for Efficient Parallel Speed-up Demonstrated for Center-Based Data Clustering Algorithms", Retrieved at << http://citeseerx.ist.psu.edu/viewdoc/download-?doi=10.1.1.33.3784&rep=rep1&type=pdf >>, Lecture Notes in Computer Science, Proceedings of the 4th European Conference on Principles of Data Mining and Knowledge Discovery, vol. 1910, Sep. 13-16, 2000, pp. 10.

Yang, et al., "A GPGPU Compiler for Memory Optimization and Parallelism Management", Jun. 5-10, 2010, 12 pages, Toronto, Ontario, Canada. Copyright @ 2010 ACM 978-1-4503-0019—Mar. 10, 2006.

Metcalf, Michael "Array Handling", CERN CN-AS, Retrieved at <<http://w3.pppl.gov/~hammett/comp/f90tut/f90.tut5.html>> on Jun. 30, 2010.

"Appendix 5 Intrinsic Functions in Fortran 90", last modified on Aug. 10, 2009, by boein©nsc.liu.se. Retrieved at <<http://www.nsc.liu.se/~boein/f77to90/a5.html>> on Jun. 30, 2010.

* cited by examiner

INDEXABLE TYPE TRANSFORMATIONS

BACKGROUND

Computer systems often include one or more general purpose processors (e.g., central processing units (CPUs)) and one or more specialized data parallel compute nodes (e.g., graphics processing units (GPUs) or single instruction, multiple data (SIMD) execution units in CPUs). General purpose processors generally perform general purpose processing on computer systems, and data parallel compute nodes generally perform data parallel processing (e.g., graphics processing) on computer systems. General purpose processors often have the ability to implement data parallel algorithms but do so without the optimized hardware resources found in data parallel compute nodes. As a result, general purpose processors may be far less efficient in executing data parallel algorithms than data parallel compute nodes.

Data parallel compute nodes have traditionally played a supporting role to general purpose processors in executing programs on computer systems. As the role of hardware optimized for data parallel algorithms increases due to enhancements in data parallel compute node processing capabilities, it would be desirable to enhance the ability of programmers to program data parallel compute nodes and make the programming of data parallel compute nodes easier.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A high level programming language provides an extensible set of transformations for use on indexable types in a data parallel processing environment. A compiler for the language implements each transformation as a map from indexable types to allow each transformation to be applied to other transformations. At compile time, the compiler identifies sequences of the transformations on each indexable type in data parallel source code and generates data parallel executable code to implement the sequences as a combined operation at runtime using the transformation maps. The compiler also incorporates optimizations that are based on the sequences of transformations into the data parallel executable code.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1:
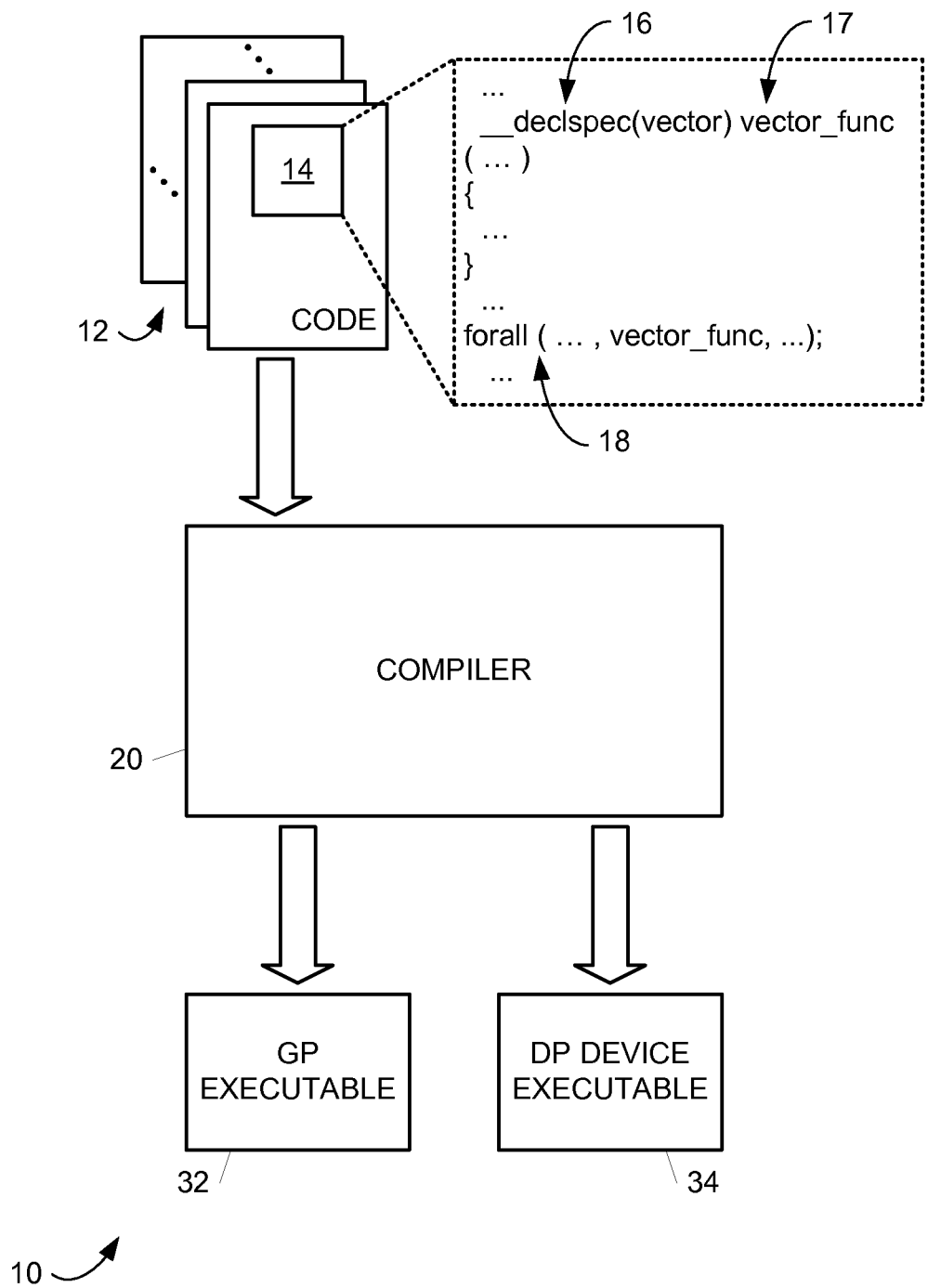
FIG. 1 is a block diagram illustrating an embodiment of a compiler environment in a computer system.

FIG. 1 is a block diagram illustrating an embodiment of a compiler environment 10 in a computer system, such as computer system 100 shown in FIG. 4 and described in additional detail below, where the computer system is executing instructions to compile code 12 with data parallel (DP) portions 14. When compiled, DP code in DP portions 14 and other non-DP code in code 12 (i.e., general purpose code) generate one or more executables—e.g., one or more general purpose (GP) executables 32 and one or more DP executables 34 as shown in FIG. 1. In other embodiments, compiler 20 may generate one or more GP executables 32 to each include one or more DP executables 34 or may generate one or more DP executable 34 without generating any GP executables 32. Compiler environment 10 is generated in response to an invocation of a compiler 20 with data parallel extensions to compile all or selected modules of code 12. The invocation may be generated by a programmer or other user of the computer system, other code in the computer system, or other code in another computer system (not shown), for example.

GP executable 32 represents a program intended for execution on one or more general purpose processors (e.g., central processing units (CPUs)). GP executable 32 includes low level instructions from an instruction set of one or more general purpose processors. DP executable 34 represents a data parallel program or algorithm (e.g., a shader) that is intended and optimized for execution on one or more data parallel (DP) optimal compute nodes such as a DP optimal compute node 211 shown in FIG. 5 and described in additional detail below. DP optimal compute nodes are typically graphic processing units (GPUs) or SIMD units of general purpose processors but may also include the scalar execution units of general purpose processors or other suitable devices in some computing environments. In one embodiment, DP executable 34 includes DP byte code that is converted to low level instructions from an instruction set of a DP optimal compute node using a device driver (not shown) prior to being executed on the DP optimal compute node. In other embodiments, DP executable 34 includes low level instructions from an instruction set of one or more DP optimal compute node where the low level instructions were inserted by compiler 20. Accordingly, GP executable 32 is directly executable by one or more general purpose processors (e.g., CPUs), and DP executable 34 is either directly executable by one or more DP optimal compute nodes or executable by one or more DP optimal compute nodes subsequent to being converted to the low level instructions of the DP optimal compute node.

In one embodiment, code 12 includes a sequence of instructions from a high level general purpose programming language with data parallel extensions (hereafter GP language) that form a program stored in a set of one or more modules. The GP language may allow the program to be written in different parts (i.e., modules) such that each module may be stored in separate files or locations accessible by the computer system. The GP language provides a single language for programming a computing environment that includes one or more general purpose processors and one or more special purpose, DP optimal compute nodes. Using the GP language, a programmer may include both general purpose processor and DP source code in code 12 for execution by general purpose processors and DP compute nodes, respectively, and coordinate the execution of the general purpose processor and DP source code. Code 12 may represent any suitable type of code in this embodiment, such as an application, a library function, or an operating system service.

The GP language may be formed by extending a widely adapted, high level, and general purpose programming language such as C or C++ to include data parallel features. Other examples of general purpose languages in which DP features may appear include Java™, PHP, Visual Basic, Perl, Python™, C#, Ruby, Delphi, Fortran, VB, F#, OCaml, Haskell, Erlang, NESL, Chapel, and JavaScript™. The GP language may include rich linking capabilities that allow different parts of a program to be included in different modules as shown in FIG. 1 with code 12. The data parallel features provide programming tools that take advantage of the special purpose architecture of DP optimal compute nodes to allow data parallel operations to be executed faster or more efficiently than with general purpose processors (i.e., non-DP optimal compute nodes). The GP language may also be another suitable high level general purpose programming language that allows a programmer to program for both general purpose processors and DP optimal compute nodes.

In another embodiment, code 12 includes a sequence of instructions from a high level data parallel programming language (hereafter DP language) that form a program. The DP language provides a specialized language for programming a DP optimal compute node in a computing environment with one or more DP optimal compute nodes. Using the DP language, a programmer generates DP source code in code 12 that is intended for execution on DP optimal compute nodes. The DP language provides programming tools that take advantage of the special purpose architecture of DP optimal compute nodes to allow data parallel operations to be executed faster or more efficiently than with general purpose processors. The DP language may be an existing DP programming language such as HLSL, GLSL, Cg, C, C++, NESL, Chapel, CUDA, OpenCL, Accelerator, Ct, PGI GPGPU Accelerator, CAPS GPGPU Accelerator, Brook+, CAL, APL, Fortran 90 (and higher), Data Parallel C, DAPPLE, or APL. Code 12 may represent any suitable type of DP source code in this embodiment, such as an application, a library function, or an operating system service.

Code 12 includes one or more portions 14 in one or more modules with code designated for execution on a DP optimal compute node. In one embodiment where code 12 is written with a GP language, the GP language allows a programmer designate a portion 14 of GP code 12 as DP source code using an annotation 16 (e.g., _declspec(vector) . . . ) when defining a vector function. The annotation 16 is associated with a function name 17 (e.g., vector_func) of the vector function that is intended for execution on a DP optimal compute node. Code portions 14 may also include one or more invocations 18 of a vector function (e.g., forall . . . , vector_func, . . . ) at a call site (e.g., forall, reduce, scan, or sort). A vector function corresponding to a call site is referred to as a kernel function. A kernel function may call other vector functions in code 12 (i.e., other DP source code) and may be viewed as the root of a vector function call graph. A kernel function may also use types (e.g., classes or structs) defined by code 12. The types may or may not be annotated as DP source code. In other embodiments, other suitable programming language constructs may be used to designate portions 14 of code 12 as DP source code and/or general purpose processor code. In addition, annotations 16 may be omitted in embodiments where code 12 is written in a DP language.

Figure 2:
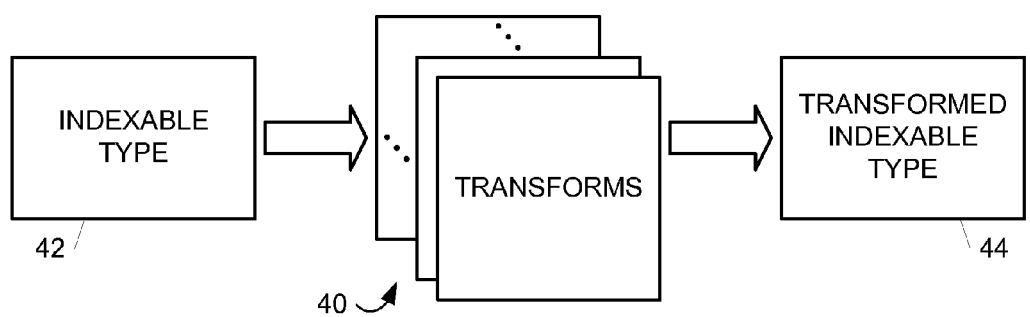
FIG. 2 is a block diagram illustrating an embodiment of applying a set of transformations to an indexable type.

With reference to FIG. 2, the high level language of code 12 provides a set of transformations 40 for use on indexable types 42 in a data parallel processing environment. An indexable type 42 is any type that implements one or more subscript operators along with a rank, which is a non-negative integer, and a type which is denoted element_type. If index<N> is a type that represents N-tuples of integers (viz., any type of integral data type), an instance of index<N> is a set of N integers {i0, i1, . . . , im} where m is equal to N−1 (i.e., an N-tuple). An index operator of rank N takes an N-tuple instance of index<N> and associates the instance with another instance of a type called the element type where the element type defines each element in indexable type 42. In one embodiment, an indexable type 42 defines one or more of the following operators:

```
element_type operator [ ] (index_declarator) ;
const element_type operator [ ] (index_declarator) const;
element_type& operator [ ] (index_declarator) ; or
const element_type& operator [ ] (index_declarator) const;
    where index_declarator takes the form:
    const index<rank>& idx;
    const index<rank> idx;
    index<rank>& idx; or
    index<rank> idx.
```

In other embodiments the operators may be functions, functors or a more general representation. The category of indexable types with a given rank and element type has an initial object called field. Indexable types are aspects of both the indexable types 42 and the transformations 40. An indexable type has a shape that is a polytope—i.e., an indexable type may be algebraically represented as the intersection of a finite number of half-planes formed by linear functions of the coordinate axes.

Compiler 20 implements each transformation 40 as a map from indexable types 42 to allow each transformation 40 to be applied to other transformations 40. At compile time, compiler 20 identifies sequences of the transformations 40 on each indexable type 42 in code 12 and generates a DP executable 34 to implement the sequences as a combined operation at runtime using the transformation maps. Compiler 20 also incorporates optimizations that are based on the sequences of transformations into DP executable 34. When executed, DP executable 34 applies the set of transforms 40 to an indexable type 42 to generate a transformed indexable type 44.

The set of transformations 40 may include any suitable combination of transpose, spread, shift, cshift, tile, project, projections, split, halo, neighborhood, interior, section, reshape, and read_only as well as user defined transformations. The transpose, spread, shift, and cshift transformations 40 represent transform range patterns, and the tile, project, projections, and split transformations 40 represent range patterns. Transformations 40 are illustrated with reference to FIGS. 3A-3N.

Figure 3A:
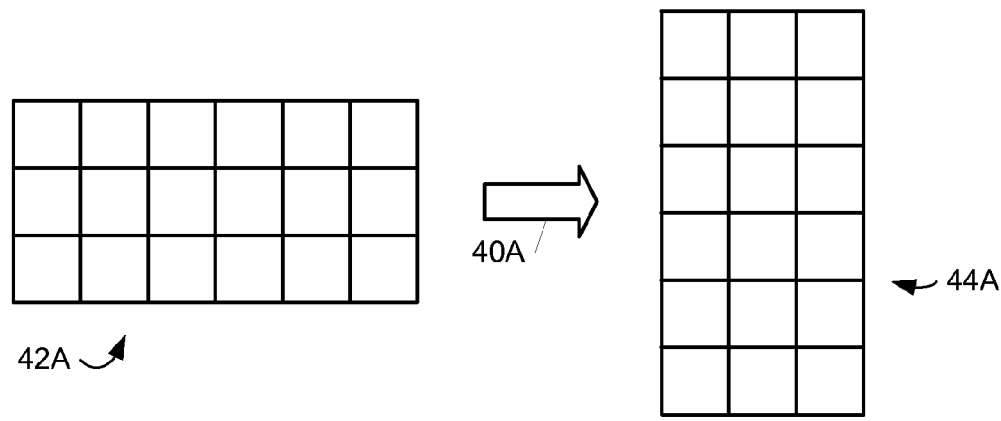
FIGS. 3A-3N are block diagrams illustrating embodiments of transformations that may be applied to an indexable type.

FIG. 3A illustrates a transpose transformation 40A. A transpose transformation 40A swaps two dimensions of indexable type 42A to generate transformed indexable type 44A. In one embodiment, transpose transformation 4012A moves a specified dimension to the farthest right position. For example, a transpose transformation 40A that specifies the x dimension may swap the x and y dimensions of indexable type 42A to generate transformed indexable type 44A as shown in FIG. 3A. In another embodiment, transpose transformation 40A swaps two specified dimensions.

Figure 3B:
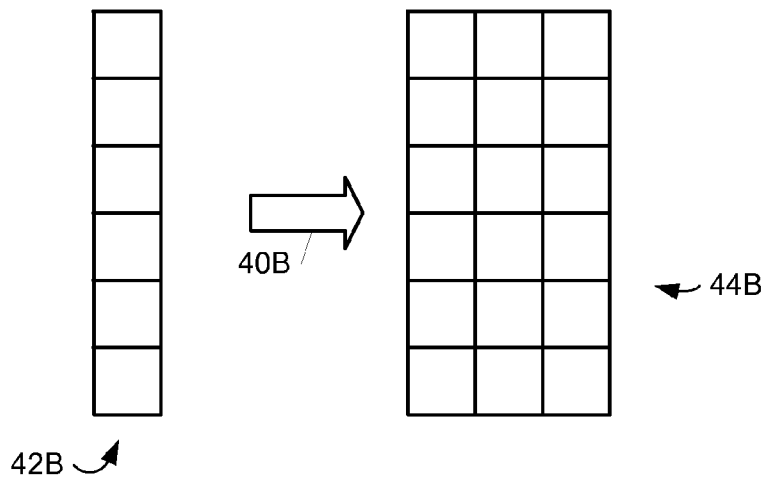

FIG. 3B illustrates a spread transformation 40B. A spread transformation 40B adds a dimension to an indexable type 42B at a specified slot to generate transformed indexable type 44B. In the example of FIG. 3B, a spread transformation 40B that specifies the x dimension adds the x dimension to the y-only dimension of indexable type 42B to generate transformed indexable type 44B. Although shown in FIG. 3B, the added dimension is only added conceptually and has infinite extent.

Figure 3C:
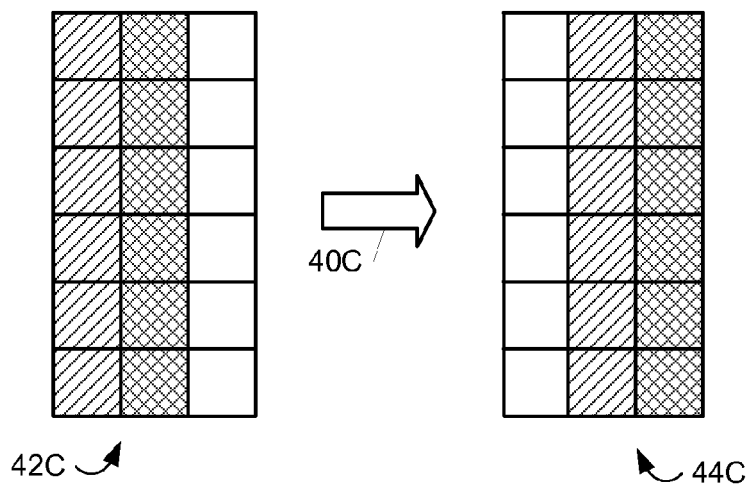

FIG. 3C illustrates a shift transformation 40C. A shift transformation 40C shifts a specified dimension of an indexable type 42C by a specified linear distance to generate a transformed indexable type 44C. In the example of FIG. 3C, a shift transformation 40C specifies the x dimension and a linear distance of one to shift the x dimension of indexable type 42C by one in generating transformed indexable type 44C.

Figure 3D:
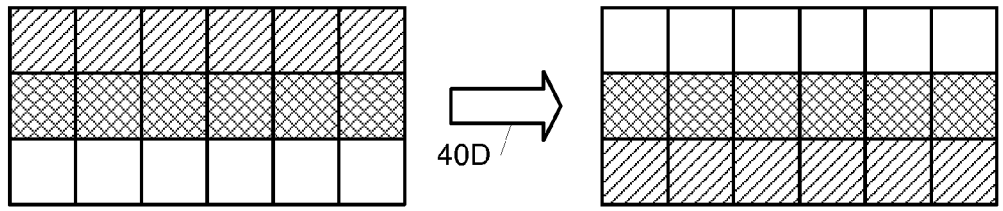

FIG. 3D illustrates a cshift transformation 40D. A cshift transformation 40D shifts a specified dimension of an indexable type 42D by a specified rotational distance to generate a transformed indexable type 44D. In the example of FIG. 3D, a cshift transformation 40D specifies the x dimension and a rotational distance of one to rotate the x dimension of indexable type 42D by one in generating transformed indexable type 44D.

Figure 3E:
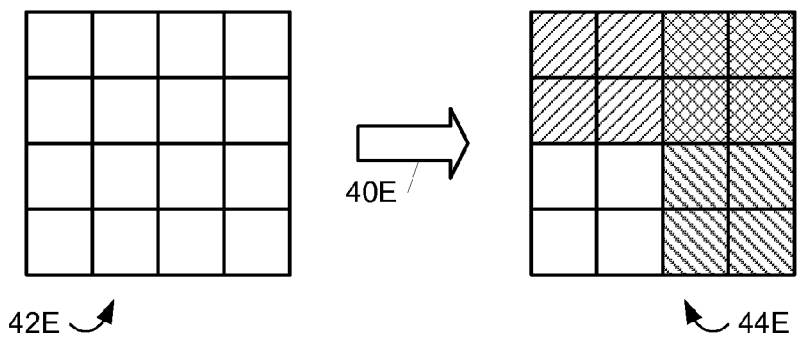

FIG. 3E illustrates a tile transformation 40E. A tile transformation 12E partitions an indexable type 42E into a collection of same-sized sub-arrays to generate a transformed indexable type 44E. In the example of FIG. 3E, a tile transformation 40E partitions a 4×4 indexable type 42E into a 2×2 transformed indexable type 44E.

Figure 3F:
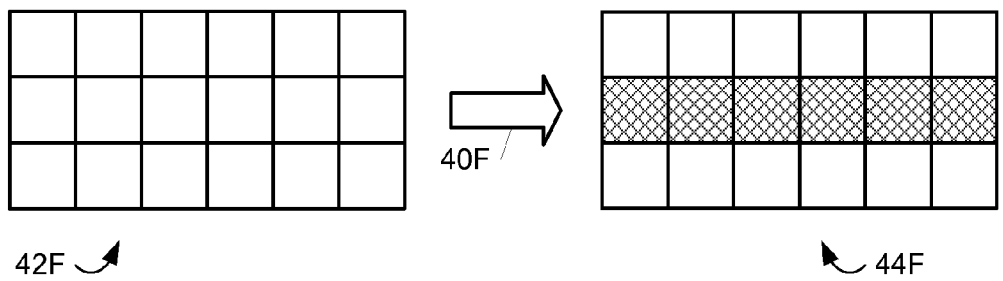

FIG. 3F illustrates a project transformation 40F. A project transformation 40F performs a dimension reduction on an indexable type 42F for a specified slice of a dimension to generate a transformed indexable type 44F as a hyperplane. In the example of FIG. 3F, a project transformation 40F reduces indexable type 42F to the second row in the y dimension to generate a transformed indexable type 44F as the shaded hyperplane.

Figure 3G:
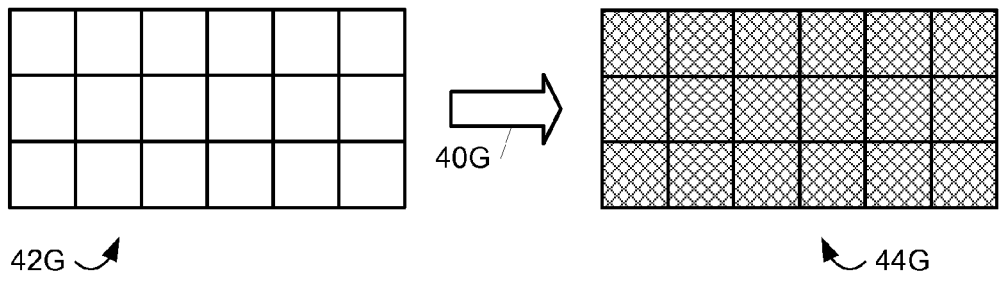

FIG. 3G illustrates a projection transformation 40G. A projection transformation 40G generates the collection of all possible project transformations in a given direction. In the example of FIG. 3G, a projection transformation 40G generates the collection of all possible project transformations in the y direction (i.e., all rows) in a transformed indexable type 44G from the indexable type 42G.

Figure 3H:
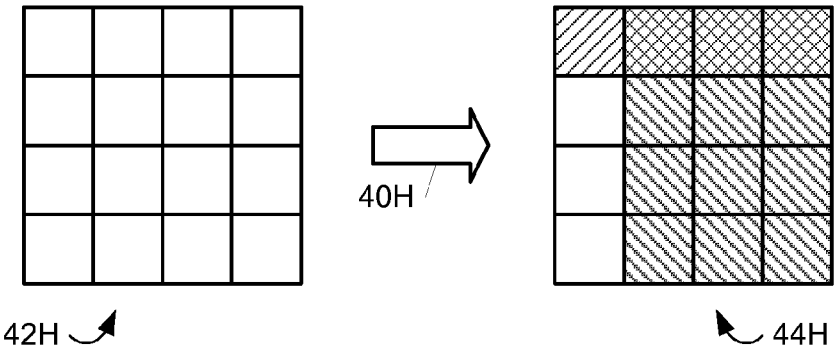

FIG. 3H illustrates a split transformation 40H. A split transformation 40H splits an indexable type 42H along a non-boundary pivot point to generate a transformed array 44H with $2^R$ sub-arrays where R is the number of dimensions of the indexable type 42H. A degenerate form of split transformation 40H occurs on a boundary pivot point of indexable type 42H to generate a transformed indexable type 44H with $2^B$ sub-arrays where B is the dimension of the boundary containing the boundary pivot point in the indexable type 42H. In the example of FIG. 3H, a split transformation 40H splits an indexable type 42H along a non-boundary pivot point to generate a transformed array 44H with four sub-arrays.

Figure 3I:
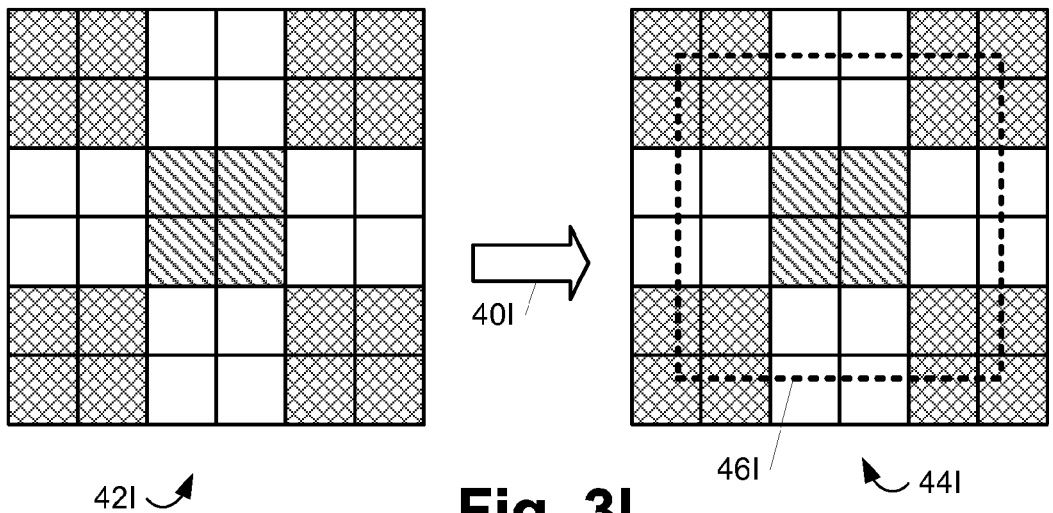

FIG. 3I illustrates a halo transformation 40I. A halo transformation 40I receives a tiled indexable type 42I (i.e., an indexable type 42 transformed using the tile transformation 40E) and generates a transformed indexable type 44I to include sets of elements from the tiled indexable type 42I that are within a specified distance outside of corresponding tiles. In the example of FIG. 3I, a halo transformation 40I generates transformed indexable type 44I to include the set of elements that are inside a dotted square 46I that represents the specified distance outside of corresponding tile in indexable type 42J as well as the sets of elements that are inside corresponding squares for the remaining tiles. In other embodiments, the specified distance may be represented by a circle or another suitable shape.

Figure 3J:
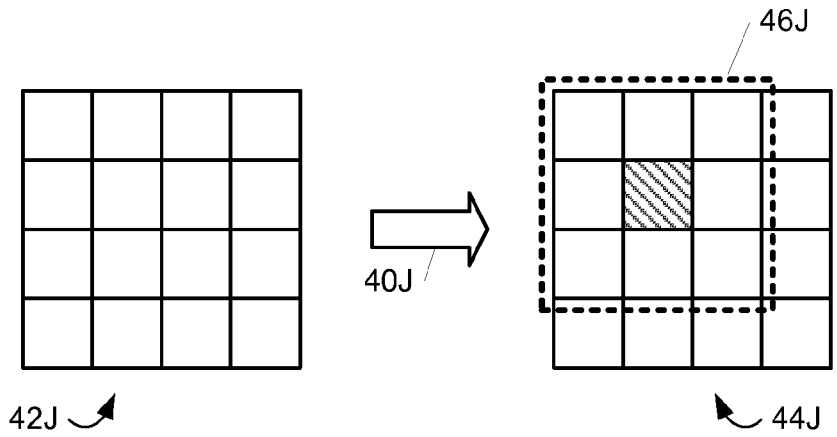

FIG. 3J illustrates a neighborhood transformation 40J. A neighborhood transformation 40J generates a transformed indexable type 44J to include sets of elements from an indexable type 42J that are within a specified distance of corresponding elements. In the example of FIG. 3J, a neighborhood transformation 40J generates transformed indexable type 44J to include the set of elements that are inside a dotted square 46J that represents the specified distance for the shaded element in indexable type 42J as well as the sets of elements that are inside corresponding circles for the remaining unshaded elements. In other embodiments, the specified distance may be represented by a circle or another suitable shape.

Figure 3K:
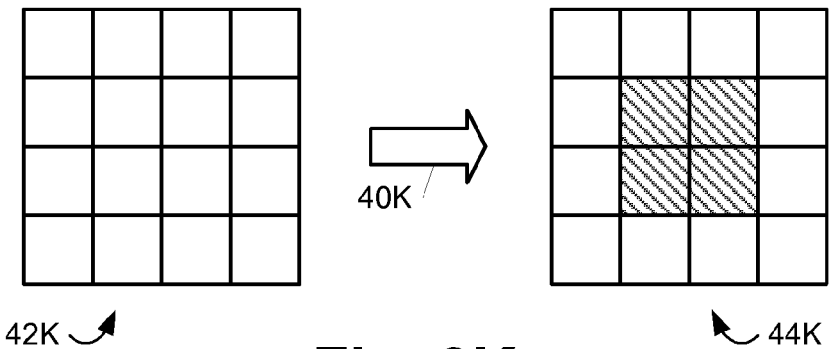

FIG. 3K illustrates an interior transformation 40K. An interior transformation 40K generates a transformed indexable type 44K to include all elements in an indexable type 42K that are at least a specified distance away from a boundary of indexable type 42K. In the example of FIG. 3K, an interior transformation 40K generates transformed indexable type 44K to include the elements in indexable type 42K that are at least one element away from a boundary of indexable type 42K.

Figure 3L:
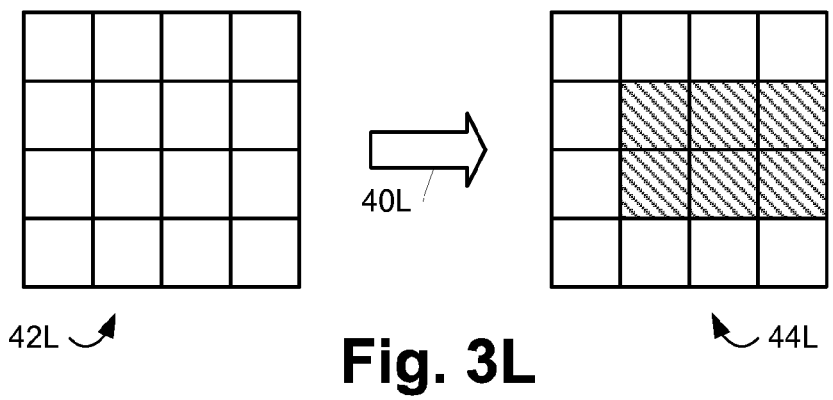

FIG. 3L illustrates a section transformation 40L. A section transformation 40L generates a transformed indexable type 44L to include a specified rectangular section of elements in an indexable type 42L. The rectangular section may be specified by an offset into indexable type 42L and an extent for each dimension of indexable type 42L. In the example of FIG. 3L, a section transformation 40L generates transformed indexable type 44L to include the shaded elements from indexable type 42L using a specified offset of (1, 1), an extent for the x dimension of 3, and an extent for the y dimension of 2.

Figure 3M:
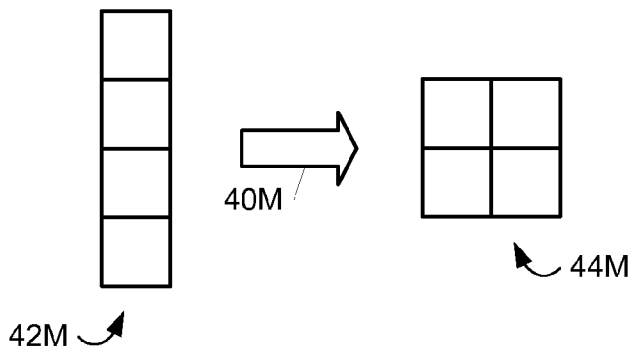

FIG. 3M illustrates a reshape transformation 40M. A reshape transformation 40M morphs a shape of an indexable type 42M into a transformed indexable type 44M with a different shape while maintaining the total extent (i.e., the total N-dimensional volume) of indexable type 42M. In the example of FIG. 3M, a reshape transformation 40M morphs a one dimensional indexable type 42M (i.e., a 4×1 array) with a total extent of four (i.e., a 4×1 array) into a two dimension transformed indexable type 44M (i.e., a 2×2 array) with a total extent of four.

Figure 3N:
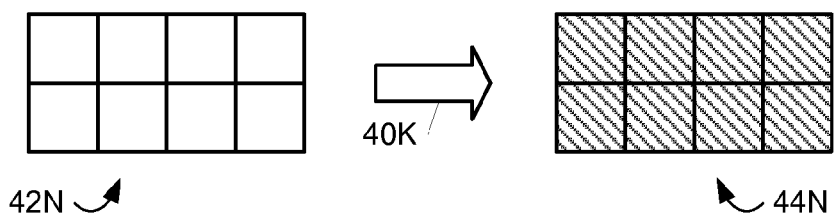

FIG. 3N illustrates a read_only transformation 40N. A read_only transformation 40N generates a non-modifiable transformed indexable type 44N from an indexable type 42N without changing the shape or physical representation of indexable type 42N. In the example of FIG. 3N, a read_only transformation 40N generates a non-modifiable transformed indexable type 44N, as indicated by the shaded elements, from indexable type 42N without changing the shape or physical representation of indexable type 42N.

As noted above, the transpose, spread, shift, and cshift transformations 40 represent transform range patterns, and the tile, project, projections, and split transformations 40 represent range patterns.

The transform range pattern include those transformations 40 representable by a transformation from index<N> to index<M> for some M and N. With the transform range pattern transformations 40, compiler 20 can deduces at compile time exactly what transformation sequence has occurred. For example, a spread transformation 40B, spread<1>, is the operation of adding a dimension at slot 1. So an indexable type 42, f(x0, x1, x2), (viz., a rank 3 indexable type) is transformed into a new indexable type spread<1>(f) that is a rank 4 indexable type such that spread<1>(f)(x0, x1, x2, x3)=f(x0, x2, x3) (viz., slot 1 is a dummy). As another example, consider a transpose transformation 40A, transpose<0, 2>, which is the operation of swapping dimension 0 with dimension 2, so that for a rank-3 indexable type 42, f, transpose<0, 2>(f)(x0, x1, x2)=f(x2, x1, x0). A further example involves a shift transformation 40C, shift<1, 5>(f), which represents shifting dimension 1 by 5 so that shift<1, 5>(f) (x0, x1, x2)=f(x0, x1+5, x2). Yet another example involves, a cshift transformation 40D, cshift<0, −2>(f), which represents a circular shift of dimension 0 by −2 and requires the grid of the field to make sense. With a 2-dimensional indexable type 42 f of float4's over the grid (10, 20) where the grid is the rectangle based at (0,0) with length 10 in the vertical direction and length 20 in the horizontal direction, cshift<0, −2>(f) (x0, x1)=f((x0−2) % 10, x1). For a last example, a reshape transformation 40M with a 2-D indexable type 42 'f' of float4's over the grid(10, 20) changes the dimensions of the grid rectangle (e.g., reshape<5, 40>(f)→changes to grid(5, 40); reshape<200>(f)→changes to grid(200); and reshape<10, 2, 10>(f)→changes to grid(10, 2, 10)).

The range pattern involves a collection of indexable types. Let Indexable<N> be any indexable type 42 of rank N, meaning the index operators act on instances of type index<N>. The return type of the subscript operator (i.e., the element type) is Indexable<N>::element_type. The calculus of tile transformations 40E, projection transformations 40G, and split transformations 40H yield the following isomorphisms. For tile, tile<grid_tile>: Indexable<N>→range<N, Indexable<N>> is the collection of Indexable<N> restricted to grid_tile, indexed by Indexable<N>/grid_tile. More particularly, if grid describes the shape of Indexable<N>, then range<N, Indexable<N>> is the collection of Indexable<N> restricted to grid_tile translated by offset in grid_range= (grid+grid_tile−1)/grid_tile. Accordingly, grid_range is the shape of range<N, Indexable<N>> when created by tile<grid_tile>(Indexable<N>). For projections, projections<0>: Indexable<N>→range<1, Indexable<N−1>> is the 1-D collection of N−1 dimensional slices of Indexable<N> in the 0-direction. For example, if Indexable<2> is the 1024×1024 screen of float4 pixels, then projections<0>(Indexable<2>) is the collection of all rows in the 1024×1024 screen. For split, split<idx>: Indexable<N>→range<N, Indexable<N>> is the collection of all N-dimensional subsets of Indexable<N> restricted to the element grids determined by splitting on 'index<N>idx'. For example, when Indexable<2> is the 1024×1024 screen of float4 pixels and idx={512, 512}, then split<idx> yields 4 sub-objects of extent 512×512 with offsets at {0, 0}, {0, 512}, {512, 0}, {512,512}. In three dimensions, such an interior split transformation yields 8 sub-objects. If the split transformation is not interior like {0, 512}, then the split transformation yields 2 sub-objects with extent 1024×512 with offsets {0,0}, {0,512}. The term 'Indexable<N> restricted to the element grids' is used because there are no memory operations. Instead, the original memory store for Indexable<N> is restricted to several smaller grids (i.e., element grids) that form a partitioning of the original set of valid index<N> points for which the index operator of Indexable<N> was originally defined.

All 'range' instances constructed by transformations 40 take the original domain of the definition or shape of Indexable<N>, which, without loss of generality, is referred to as Indexable<N>.grid. By definition, the index operators of Indexable<N> act on every index<N> described by Indexable<N>.grid. In forming range<N1, Indexable<N2>>, a partitioning of Indexable<N>.grid is formed and the collection defined by range<N1, Indexable<N2>> is the original Indexable<N> restricted to a N2-dimensional partitioning— the set of which is parametrized by an N1-dimensional set of index<N1>. The optimization deducible by compiler 20 at compile time is that range<N, Indexable<N>> is a partitioning of the original Indexable<N>.

Compiler 20 may also perform the following optimizations for transformations 40.

When compiler 20 detects a transpose transformation 40A, transpose<i, j>, and one of i or j is a dimension that has a unit-stride layout in memory—assume i is the unit-stride dimension—then compiler 20 tries to access memory in the j direction—because after the transpose transformation 40A, j is now the unit stride dimension. Compiler 20 attempts to implement the optimization described in sections 3.2, 3.3, and 3.7 in Yi Yang et al., "A GPGPU Compiler for Memory Optimization and Parallelism Management", ACM Sigplan Notices, vol. 45, issue 6, June 2010 pp. 86-97 which is incorporated by reference herein in its entirety. Compiler 20 may also apply the optimization to any transformation 40 that has altered the concept of 'unit-stride-dimension'. Compiler 20 may further apply the optimizations in sections 3.5 and 3.6 from the above Yang reference in most cases.

Compiler 20 may also perform an optimization that unrolls and jams the implicit loops representing the compute domain for any of the transforms 40. This optimization is analogous to the optimization in section 3.5 of the above Yang reference.

When compiler 20 detects a spread transformation 40B, spread<k>, compiler 20 knows that it does not need to care about dimension k. Compiler 20 normally tracks which dimension has unit-stride memory layout through all transformations 40. By recognizing that dimension k is a 'dummy' with spread<k>, compiler 20 knows that nothing done to dimension k needs to be tracked. For example in shift<1, 12>(spread<1>(f))~=spread<1>(f), compiler 20 knows that because dimension 1 is a dummy and shifting it by 12 does nothing. Other examples include projections<1>(spread<1> (f))~=f; project<1, 12>(spread<1>(f))~=f//project<1, 12> is the slice of fin the 1-dimension through 12; cshift<1, 12> (spread<1>(f))~=spread<1>(f); reshape<10, 5, 2>(spread<1>(f))~=spread<1>(reshape<10,2>(0); tile<8,4, 16>(spread<1>(f))~=spread<1>(file<8,16>(0); split<512, 64, 128>(spread<1>(0)~=spread<1>(split<512,128>(0). Compiler 20 performs similar optimizations, as well as strip mining and loop interchange, for halo transformations 40I, neighborhood transformations 40J, interior transformations 40K, and read_only transformations 40N.

When compiler 20 detects a shift transformation 40C, compiler 20 knows to changes the bounds checking code of the compiler 20 by the amount and direction specified by the shift transformation 40C.

A project transformation 40F, project<_I, _Val>, means project away the _I dimension by fixing _I=_Val. For example if _I=0 and an indexable type 42 'f' is 1024×1024 pixels, then project<0, 512>(f) is the vertical slice of pixels though {0, 512}. Compiler 20 performs an optimization to keep track of when the unit-stride dimension has been projected away, in which case, compiler 20 implements the optimization described in sections 3.2 and 3.3 in "A GPGPU Compiler for Memory Optimization and Parallelism Management" which is incorporated by reference above.

A halo transformation 40I may be specified by a value index<N> that describes how much every point has a neighborhood of validity. For example, the 1024×1024 pixel example from above may be partitioned into 16×16 tiles. Then halo<2, 4> applied to the tiled indexable array 42 implies that around every tile an extra two pixels can be accessed on either side in the vertical direction and an extra four pixels can be accessed in the horizontal direction. For a non-tiled indexable type, then halo<idx> implies that you can access idx[_I] extra points on both sides of the _I dimension. The halo functional equation halo<idx>(range<N, Indexable<M>>)~=range<N, halo<idx>(Indexable<M>)> allows compiler 20 to make an assumption about bounds checking.

An interior transformation 40K, interior<idx>, is the non-tiled inverse of a halo transformation 40I. Interior<idx>(f) takes an indexable type 42 and restricts it by idx. Consider the 1024×1024 example, then interior<8, 8>(f).grid.extent~={1008, 1008} and interior<8, 8>(f).grid.offset~={8, 8}. In other words, interior<8, 8>(f) is formed by restricting f to the sub-grid defined by forming an apron of distance 8 from both the x and y axes. interior<idx> allows compiler 20 to make assumptions in bounds checking. The functional equation is halo<idx>(interior<idx>(f))~=f.

A neighborhood transformation 40J, neighborhood<idx>, is used for cache tiling or cache blocking in compiler optimization by compiler 20. In particular, neighborhood<64, 64>(f) tells compiler 20 to tile loops into 64×64 tiles of indices.

A read_only transformation 40N, read_only<f>, tells compiler 20 that the memory represented by f may be distributed across many DP compute nodes or separate processes in any form. Accordingly, compiler 20 and corresponding runtime code may avoid checking for changes occurring to the original memory after distributing the read_only transformed indexable type 44 to different memory or coherence domains.

Figure 4:
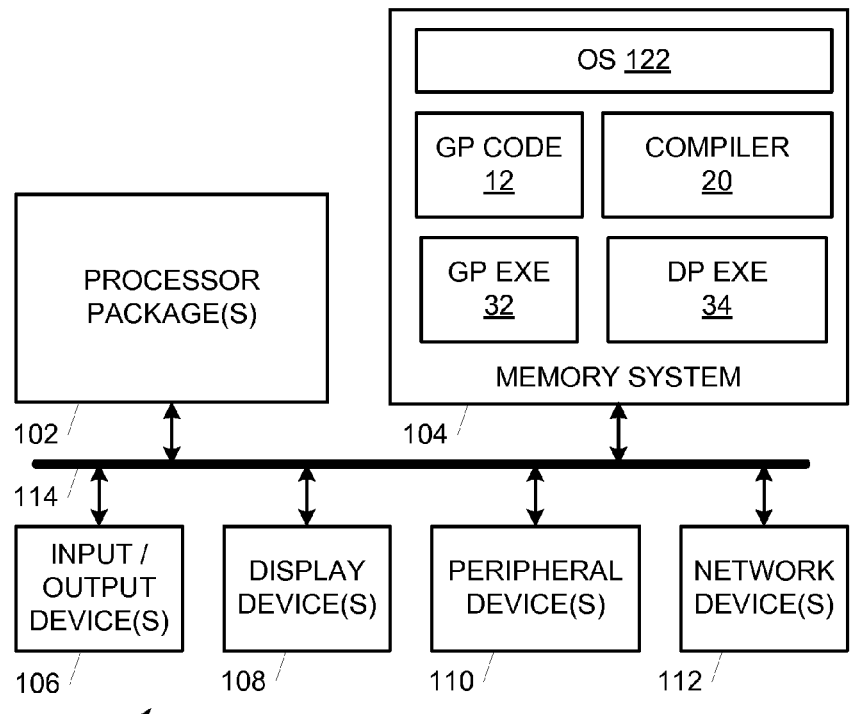
FIG. 4 is a block diagram illustrating an embodiment of a computer system configured to implement a compiler environment.

FIG. 4 is a block diagram illustrating an embodiment of a computer system configured to implement compiler environment 10 as shown in FIG. 1.

Computer system 100 includes one or more processor packages 102, a memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, a smart phone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 each include one or more processing elements (shown in FIG. 5) that form execution hardware configured to execute instructions (i.e., software). Each processor package 102 may include processing elements with the same or different architectures and/or instruction sets. For example, the processing elements may include any combination of in-order execution elements, superscalar execution elements, and data parallel execution elements (e.g., GPU execution elements). Each processing element is configured to access and execute instructions stored in memory system 104. The instructions may include a basic input output system (BIOS) or firmware (not shown), an operating system (OS) 122, GP code 12, compiler 20, and GP executable 32 with DP executable 34. Each processing element may execute the instructions in conjunction with or in response to information received from input/output devices 106, display devices 108, peripheral devices 110, and/or network devices 112.

Computer system 100 boots and executes OS 122. OS 122 includes instructions executable by the processing elements to manage the components of computer system 100 and provide a set of functions that allow programs to access and use the components. In one embodiment, OS 122 is the Windows operating system. In other embodiments, OS 122 is another operating system suitable for use with computer system 100. Computer system 100 executes compiler 20 to generate GP executable 32 and DP executable 34 from GP code 12 as described above. Computer system 100 may execute GP executable 32 and DP executable 34 using one or more processing elements as described with reference to the embodiment of FIG. 5 below.

Memory system 104 includes any suitable type, number, and configuration of volatile or non-volatile storage devices configured to store instructions and data. The storage devices of memory system 104 represent computer readable storage media that store computer-executable instructions (i.e., software) including OS 122, GP code 12, compiler 20, GP executable 32, and DP executable 34. The instructions are executable by computer system 100 to perform the functions and methods of OS 122, GP code 12, compiler 20, GP executable 32, and DP executable 34 as described herein. Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112. Examples of storage devices in memory system 104 include hard disk drives, random access memory (RAM), read only memory (ROM), flash memory drives and cards, and magnetic and optical disks such as CDs and DVDs.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Figure 5:
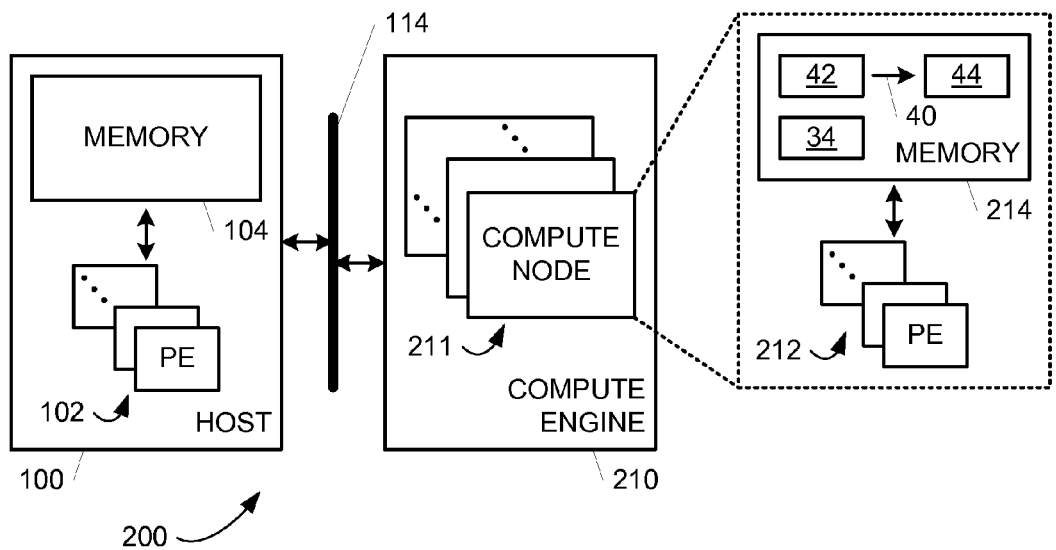
FIG. 5 is a block diagram illustrating an embodiment of a computer system with a data parallel compute engine that is configured to execute data parallel code with a set of transformations.

FIG. 5 is a block diagram illustrating an embodiment of a computer system 200 with a compute engine 210 that is configured to execute a DP executable 34. Compute engine 210 includes one or more compute nodes 211. Each compute node 211 is a collection of computational resources that share a memory hierarchy. Each compute node 211 includes a set of one or more processing elements (PEs) 212 and a memory 214 that stores DP executable 34. PEs 212 execute DP executable 34 and store the results generated by DP executable 34 in memory 214. In particular, PEs 212 execute DP executable 34 to apply at least one transformation 40 to an indexable type 42 to generate a transformed indexable type 44 as shown in FIG. 5 and described above.

A compute node 211 that has one or more computational resources with a hardware architecture that is optimized for data parallel computing (i.e., the execution of DP programs or algorithms) is referred to as a DP optimal compute node 211. Examples of a DP optimal compute node 211 include a node 211 where the set of processing elements 212 includes one or more GPUs and a node 211 where the set of processing elements 212 includes the set of SIMD units in general purpose processing elements 102. A compute node 211 that does not have computational resources with a hardware architecture that is optimized for data parallel computing (e.g., processor packages 102 with only general purpose processing elements) is referred to as a non-DP optimal compute node 211. In each compute node 211, memory 214 may be separate from memory 104 (e.g., GPU memory used by a GPU) or a part of memory 104 (e.g., memory used by SIMD units in general purpose processing elements 102).

In the embodiment of FIG. 5, computer system 100 (shown in FIG. 4) forms a host compute node that is configured to provide DP executable 34 to a compute node 211 for execution and receive results generated by DP executable 34 using interconnections 114 (FIG. 4). The host compute node includes is a collection of general purpose computational resources (i.e., general purpose processing elements of processor packages 102) that share a memory hierarchy (i.e., memory 104). The host compute node may be configured with a symmetric multiprocessing architecture (SMP) and may also be configured to maximize memory locality of memory 104 using a non-uniform memory access (NUMA) architecture, for example.

OS 122 (FIG. 4) of the host compute node is configured to execute a DP call site to cause a DP executable 34 to be executed by a DP optimal or non-DP optimal compute node 211. In embodiments where memory 214 is separate from memory 104, the host compute node causes DP executable 34 and one or more indexable types 42 to be copied from memory 104 to memory 214. In embodiments where memory 104 includes memory 214, the host compute node may designate a copy of DP executable 34 and/or one or more indexable types 42 in memory 104 as memory 214 and/or may copy DP executable 34 and/or one or more indexable types 42 from one part of memory 104 into another part of memory 104 that forms memory 214. The copying process between compute node 211 and the host compute node may be a synchronization point unless designated as asynchronous.

The host compute node and each compute node 211 may concurrently execute code independently of one another. The host compute node and each compute node 211 may interact at synchronization points to coordinate node computations.

In one embodiment, compute engine 210 represents a graphics card where one or more graphics processing units (GPUs) include PEs 212 and a memory 214 that is separate from memory 104 (FIG. 4). In this embodiment, a driver of the graphics card (not shown) may convert byte code of DP executable 34 into the instruction set of the GPUs for execution by the PEs 212 of the GPUs.

In another embodiment, compute engine 210 is formed from the combination of one or more GPUs (i.e. PEs 212) that are included in processor packages 102 (FIG. 4) with one or more general purpose execution elements and a portion 214 of memory 104 (FIG. 4). In this embodiment, additional software may be provided on computer system 100 to convert byte code of DP executable 34 into the instruction set of the GPUs in processor packages 102.

In further embodiment, compute engine 210 is formed from the combination of one or more SIMD units in one or more of the execution elements of processor packages 102 (FIG. 4) and a portion 214 of memory 104 (FIG. 4). In this embodiment, additional software may be provided on computer system 100 to convert the byte code of DP executable 34 into the instruction set of the SIMD units in processor packages 102.

In yet another embodiment, compute engine 210 is formed from the combination of one or more scalar processing pipelines in one or more of the execution elements of processor packages 102 (FIG. 4) and a portion 214 of memory 104 (FIG. 4). In this embodiment, additional software may be provided on computer system 100 to convert the byte code of DP executable 34 into the instruction set of the scalar processing pipelines in processor packages 102.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a compiler in a computer system, the method comprising:

compiling data parallel source code written in a high level programming language that provides an extensible set of transformations for use on indexable types in a data parallel processing environment to generate data parallel executable code by:

identifying a set of two or more transformations on an indexable type in the data parallel source code, the data parallel source code configured for execution on one or more data parallel optimal compute nodes, wherein the indexable type has a rank and an element type and the compiler implements each transformation as a map from the indexable type to allow each transformation to be applied to other transformations; and generating the data parallel executable code from the data parallel source code such that the data parallel executable code implements the set of two or more transformations on the indexable type as a combined operation wherein when executed the data parallel executable code applies the set of two or more transformations to the indexable type to generate a transformed indexable type.

2. The method of claim 1 wherein at least one of the set of two or more transformations forms a transform range pattern.

3. The method of claim 1 wherein at least one of the set of two or more transformations forms a range pattern.

4. The method of claim 1 wherein the set of two or more transformations includes at least one of transpose, spread, shift, cshift, tile, project, projections, split, halo, neighborhood, interior, section, reshape, or read only.

5. The method of claim 1 wherein the one or more data parallel optimal compute nodes include at least one graphics processing unit.

6. The method of claim 1 wherein the one or more data parallel optimal compute nodes include at least one general purpose processor.

7. A method performed by a compiler in a computer system, the method comprising:

compiling code with a data parallel portion and a non-data parallel portion that provides an extensible set of transformations for use on indexable types to generate data parallel executable code and non-data parallel executable code by:

identifying first and second transformations on a first indexable type in data parallel source code of the data parallel portion intended for execution on one or more data parallel optimal compute nodes, wherein the first indexable type has a rank and an element type and the compiler implements each transformation as a map from the first indexable type to allow each transformation to be applied to other transformations; and generating the data parallel executable code from the data parallel source code that applies the first transformation to the first indexable type to generate a second indexable type corresponding to the first transformation and applies the second transformation to the second indexable type to generate a third indexable type corresponding to the second transformation.

8. The method of claim 7 wherein the data parallel source code is written in a high level general purpose programming language with data parallel extensions.

9. The method of claim 7 wherein the data parallel source code is written in a high level data parallel programming language.

10. The method of claim 7 wherein the first transformation forms a transform range pattern.

11. The method of claim 7 wherein the first transformation forms a range pattern.

12. The method of claim 7 wherein the first transformation includes at least one of transpose, spread, shift, cshift, tile, project, projections, split, halo, neighborhood, interior, section, reshape, or read_only.

13. The method of claim 7 wherein the one or more data parallel optimal compute nodes include at least one graphics processing unit.

14. A computer readable storage memory storing computer-executable instructions that, when executed by a computer system, perform a method comprising:

compiling data parallel source code that provides an extensible set of transformations for use on an indexable type in a data parallel processing environment to generate data parallel executable code by:

identifying a sequence of two or more transformations applied to the indexable type in the data parallel source code intended for execution on one or more data parallel optimal compute nodes, wherein the indexable type has a rank and an element type and the compiler implement each transformation as a map from the indexable type to allow each transformation to be applied to other transformations; and generating the data parallel executable code from the data parallel source code that optimizes the implementation of the sequence of two or more transformations on the indexable type as a combined operation wherein when executed the data parallel executable code applies the sequence of two or more transformations to the indexable type to generate a transformed indexable type.

15. The computer readable storage memory of claim 14, wherein at least a first one of the set of two or more transformations forms a transform range pattern.

16. The computer readable storage memory of claim 15, wherein at least a second one of the set of two or more transformations forms a range pattern.

17. The computer readable storage memory of claim 16, wherein the first one of the set of two or more transformations includes one of transpose, spread, shift, or cshift.

18. The computer readable storage memory of claim 17, wherein the second one of the set of two or more transformations includes one of tile, project, projections, or split.

* * * * *